Dec. 2, 1958      L. E. MILLER      2,862,636
LOADING AND CARRYING ROLLERS FOR BOAT TRAILER
Filed May 22, 1957
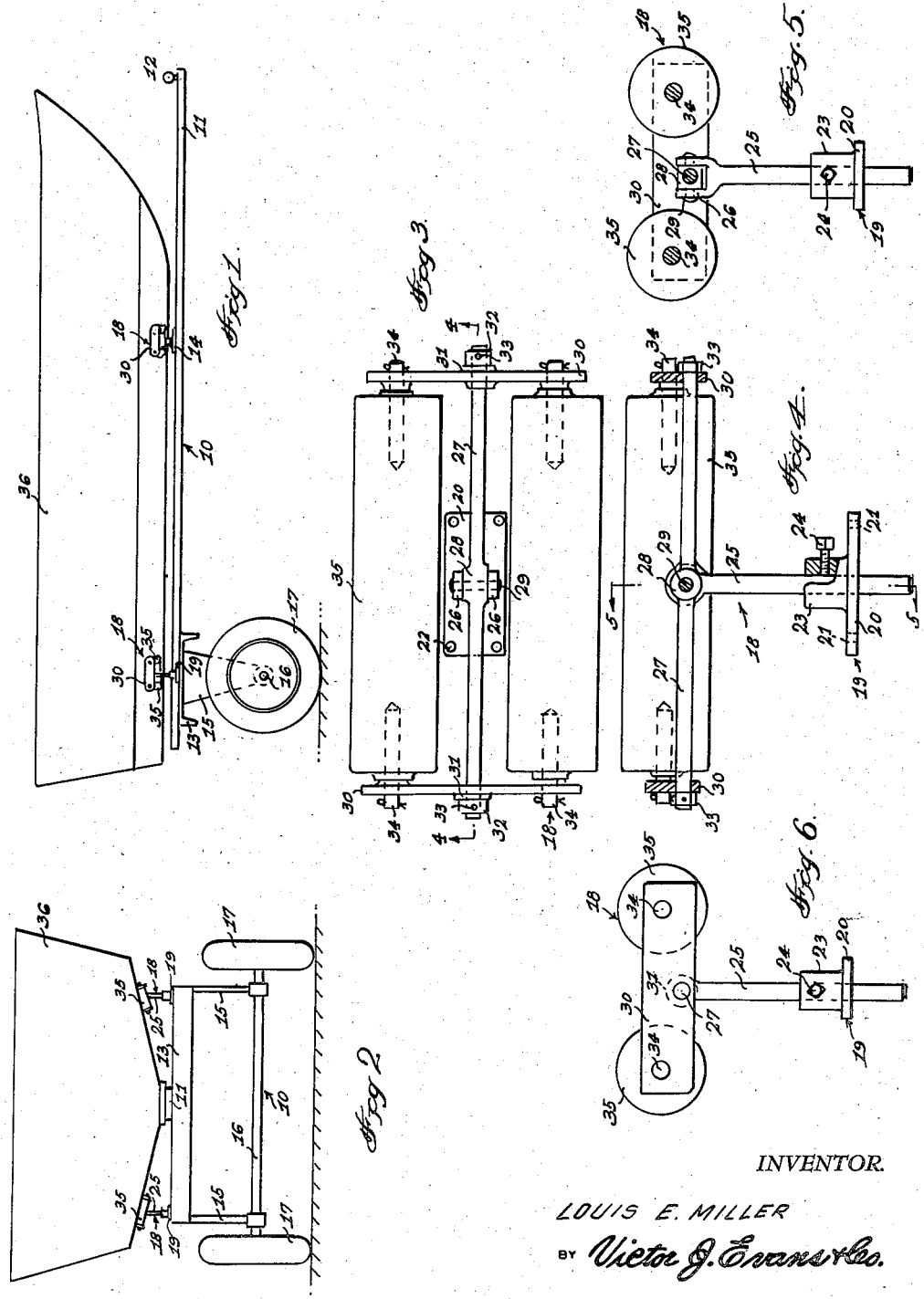
INVENTOR.
LOUIS E. MILLER
BY *Victor J. Evans & Co.*
ATTORNEYS

United States Patent Office 2,862,636
Patented Dec. 2, 1958

2,862,636

LOADING AND CARRYING ROLLERS FOR BOAT TRAILER

Louis E. Miller, Odessa, Tex.

Application May 22, 1957, Serial No. 660,916

4 Claims. (Cl. 214—505)

This invention relates to a boat trailer, and more particularly to a roller assembly for a boat trailer.

The object of the invention is to provide a roller assembly which will facilitate the loading or carrying of boats on a trailer.

Another object of the invention is to provide a boat trailer which includes a plurality of roller assemblies, each of the roller assemblies being constructed so that the rollers can pivot in several directions whereby the rollers will readily adapt themselves to the configuration or position of the boat which is being loaded or carried.

A further object of the invention is to provide a roller assembly for a boat trailer which is extremely simple and inexpensive to manufacture.

Other objects and advantages will be apparent during the course of the following description.

In the accompanying drawings, forming a part of this application, and in which numerals are used to designate like parts throughout the same.

Figure 1 is a side elevational view showing the boat supported on the trailer equipped with the rollers of the present invention.

Figure 2 is a view taken at right angles to the view shown in Figure 1.

Figure 3 is a plan view of one of the roller assemblies.

Figure 4 is a sectional view taken on the line 4—4 of Figure 3.

Figure 5 is a sectional view taken on the line 5—5 of Figure 4.

Figure 6 is an end elevational view of one of the roller assemblies.

Referring in detail to the drawings, the numeral 10 indicates a boat trailer which is provided with the usual drawbar 11 that has a hitch 12 on its front end whereby the trailer can be connected to a towing vehicle, such as an automobile or the like. The trailer 10 further includes crosspieces 13 and 14, as well as downwardly extending members 15 which support an axle 16, and the usual ground engaging wheels 17 are mounted on the axle 16.

The numeral 18 indicates each of the roller assemblies of the present invention, and each of the roller assemblies 18 have the same construction.

The numeral 19 designates the support member which includes a lower base portion 20 that is adapted to be secured to a suitable portion of the trailer frame such as the cross piece 13 or 14, and the base 20 is provided with openings 21 whereby suitable securing elements 22 can be extended through these openings and into engagement with the trailer frame. Each support member 19 further includes an upper cylindrical portion or collar 23, and a screw member 24 extends through the cylindrical portion 23 into engagement with a post or upright member 25. The lower ends of the post 25 are adapted to extend through suitable openings in the crosspiece of the trailer, and by loosening the screw members 24, the post 25 can be shifted up or down in the support members 19 and then the screw members 24 can be tightened whereby the effective height of the roller assemblies can be regulated or varied as desired.

The upper end of the post 25 is bifurcated so as to define a pair of spaced apart fingers 26, Figure 5, and a shaft 27 includes an intermediate enlarged portion of shoulder 28 which is pivotally mounted between the fingers 26 by means of a pivot pin 29.

There is further provided a pair of spaced parallel plates 30 which are provided with bearings 31, and the plates 30 are pivotally mounted on the shaft 27. These plates 30 are retained in position on the shaft 27 by means of collars or lock members 32 which may have suitable securing elements 33 extending therethrough, Figure 3.

Extending through each of the plates 30 is a pair of spaced parallel trunnions 34, and the trunnions 34 support a pair of spaced parallel rollers 35, the rollers 35 being adapted to engage the lower portion of the boat 36 which is being loaded or carried or handled.

From the foregoing, it is apparent that there has been provided a roller assembly which is especially suitable for use on trailers which are used for loading or carrying boats such as the boat 36. In use, the support members 19 are adapted to be secured to the frame of the trailer by means of a securing element 22 which extends through the openings 21 in the base 20.

It is to be understood that a plurality of the roller assemblies 18 are provided, as for example, as shown in Figures 1 and 2 whereby the boat will be conveniently supported by the roller assemblies.

As previously described, the roller assemblies each include a pair of rollers 35 which are rotatably mounted by means of the trunnions 34 so that these rollers 35 are free to rotate about an axis extending through the trunnions 34. Furthermore, the trunnions 34 are supported by the plates 30, and these plates are rotatably mounted on the shaft 27 so that the pair of rollers 35 are free to swing in an arc about an axis extending through the shaft 27. Also, the shaft 27 itself is free to pivot about an axis extending through the pivot pin 29 since the pivot pin 29 pivotally connects the shoulder 28 of the shaft 27 to the upstanding fingers 26 on the upper end of the post 25. Thus, it will be seen that the rollers 35 are capable of pivoting or moving in a plurality of different directions and this freedom of movement of the rollers 35 enables the rollers to readily adapt themselves to the configuration of position or shape of the boat 36 whereby the weight of the boat 36 will be evenly distributed or supported wherein the necessary portions of the boat 36 will be properly engaged by the rollers 35 so as to insure a firm and convenient support for the boat. By loosening the screw member 24, the post 25 can be raised or lowered in the support member 19 so that the relative elevation or position of the rollers 35 can be changed as desired.

The parts can be made of any suitable material and in different shapes or sizes.

The roller assemblies can be mounted on trailers of different shapes or sizes and the pivotal mounting 29, and 27 permits the rollers 35 to move as though they were mounted on a universal joint so that the rollers 35 will fit snugly against the bottom of the boat and wherein the load will be carried evenly by all of the rollers. By increasing the number of rollers, greater loads can be carried and by enlarging the size of the plates 30, additional rollers can be installed or used.

The above description of the invention is for illustrative purposes only and it is understood that modifications may be made in the construction within the scope and spirit of the following claims.

I claim:

1. In a boat trailer, a wheeled frame including spaced apart crosspieces, roller assemblies connected to said crosspieces and each roller assembly including a vertically disposed post, a support member arranged in engagement with said post and including a base provided with a plurality of openings for the projection therethrough of securing elements, said support member further including an upper cylindrical portion, a securing element extending through said cylindrical portion and into engagement with said post, the upper end of said post being bifurcated to define a pair of spaced parallel fingers, a shaft including an intermediate enlarged shoulder pivotally connected to said fingers, a pair of spaced parallel plates pivotally mounted on said shaft, a pair of spaced parallel trunnions extending inwardly from each plate, and a pair of spaced parallel rollers interposed between said plates and journaled on said trunnions.

2. In a roller assembly for a boat trailer, a support member including a base provided with a plurality of openings for the projection therethrough of securing elements, said support member further including an upper cylindrical portion, a securing element extending through said cylindrical portion, a vertically disposed post extending through said support member and adapted to be engaged by the said last named securing element, the upper end of said post being bifurcated to define a pair of spaced parallel fingers, a shaft including an intermediate enlarged shoulder pivotally connected to said fingers, a pair of spaced parallel plates pivotally mounted on said shaft, a pair of spaced parallel trunnions extending inwardly from each plate, a pair of spaced parallel rollers interposed between said plates, and said rollers being journaled on said trunnions.

3. In a boat trailer, a wheeled frame including spaced apart crosspieces, roller assemblies connected to said crosspieces and each roller assembly including a vertically disposed post, a support member having a base arranged in engagement with said post, said support member further including an upper cylindrical portion, the upper end of said post being bifurcated to define a pair of spaced parallel fingers, a shaft pivotally connected to said fingers, a pair of spaced parallel plates pivotally mounted on said shaft, a pair of spaced parallel trunnions extending inwardly from each plate, and a pair of spaced parallel rollers interposed between said plates and journaled on said trunnions.

4. In a roller assembly for a boat trailer, a support member including a base, said support member further including an upper cylindrical portion, a vertically disposed post extending through said support member, the upper end of said post being bifurcated to define a pair of spaced parallel fingers, a shaft pivotally connected to said fingers, a pair of spaced parallel plates pivotally mounted on said shaft, a pair of spaced parallel trunnions extending inwardly from each plate, a pair of spaced parallel rollers interposed between said plates, and said rollers being journaled on said trunnions.

References Cited in the file of this patent

UNITED STATES PATENTS

| 2,788,146 | Gronlund | Apr. 9, 1957 |

FOREIGN PATENTS

| 399,310 | France | Apr. 17, 1906 |